(12) United States Patent
Velayudham et al.

(10) Patent No.: US 11,144,308 B2
(45) Date of Patent: Oct. 12, 2021

(54) SYSTEM AND METHOD FOR PREDICTING DEFECTS IN A COMPUTER PROGRAM

(71) Applicant: Cognizant Technology Solutions India Pvt. Ltd., Chennai (IN)

(72) Inventors: Vasanthkumar Velayudham, Chennai (IN); John Wilson Raj Perianayagam, Chennai (IN); Vikul Gupta, Apex, NC (US)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 608 days.

(21) Appl. No.: 15/817,545

(22) Filed: Nov. 20, 2017

(65) Prior Publication Data

US 2019/0087179 A1 Mar. 21, 2019

(30) Foreign Application Priority Data

Sep. 15, 2017 (IN) .............................. 201741032758

(51) Int. Cl.
*G06F 9/44* (2018.01)
*G06F 8/71* (2018.01)
*G06N 7/00* (2006.01)
*G06F 11/00* (2006.01)
(Continued)

(52) U.S. Cl.
CPC .............. *G06F 8/71* (2013.01); *G06F 11/008* (2013.01); *G06F 11/36* (2013.01); *G06N 7/005* (2013.01); *G06N 20/00* (2019.01)

(58) Field of Classification Search
None
See application file for complete search history.

(56) References Cited

U.S. PATENT DOCUMENTS

| 6,477,471 | B1 | 11/2002 | Hedstrom |
| 8,296,724 | B2 | 10/2012 | Lindley |
| 8,352,904 | B2 | 1/2013 | Hodges |

(Continued)

OTHER PUBLICATIONS

Marco D'Ambros et al., "On the Relationship Between Change Coupling and Software Defects", 2009, pp. 135-144 (Year: 2009).*

(Continued)

*Primary Examiner* — Wei Y Zhen
*Assistant Examiner* — Lanny N Ung
(74) *Attorney, Agent, or Firm* — Cantor Colburn LLP

(57) ABSTRACT

A system for predicting defects in a computer program during its development is provided. The system comprises a pattern identifier module which identifies frequent sets of source code files that have been modified together in plurality of historical builds. The system further comprises a keyword extractor module which identifies frequent sets of defect keywords that have been logged together in the plurality of historical builds. The system furthermore comprises a correlation engine which establishes patterns between the frequent sets of modified source code files and the frequent set of defect keywords by identifying co-occurrence between the frequent sets of modified source code files and the frequent sets of defect keywords for each historical build. Finally, the system further comprises a defect recommendation engine which predicts defects in new builds associated with the computer program based on the established patterns.

18 Claims, 3 Drawing Sheets

(51) Int. Cl.
*G06F 11/36* (2006.01)
*G06N 20/00* (2019.01)

(56) References Cited

U.S. PATENT DOCUMENTS

| | | | |
|---|---|---|---|
| 9,038,030 | B2 | 5/2015 | Rama |
| 9,400,735 | B2 | 7/2016 | Huang |
| 9,442,821 | B2 | 9/2016 | Baker |
| 2005/0071807 | A1 | 3/2005 | Yanavi |
| 2010/0318934 | A1 | 12/2010 | Blevins |
| 2011/0067005 | A1 | 3/2011 | Bassin |
| 2011/0321007 | A1* | 12/2011 | Marum ............ G06F 8/65 717/113 |
| 2013/0311968 | A1 | 11/2013 | Sharma |
| 2014/0033174 | A1 | 1/2014 | Farchi |
| 2017/0310566 | A1 | 10/2017 | Aly Salama |

OTHER PUBLICATIONS

Igor Wiese et al., "An Empirical Study of the Relation Between Strong Change Coupling and Defects Using History and Social Metrics in the Apache Aries Project", 2015, pp. 3-12 (Year: 2015).*

A Systematic Literature Review on Fault Prediction Performance in Software Engineering; Retrieved from Internet; URL: http://ieeexplore.ieee.org/abstract/document/6035727/; Browse Journals & Magazines; IEEE Transactions on Software: vol. 38 Issue: 6; Nov. 16, 2017.

Marco D'Ambros, "Evaluating Defect Prediction Approaches: A Benchmark and an Extensive Comparison"; Retrieved rom Internet; URL: https://pdfs.semanticscholar.org/076f/0104d2f50cc19bba3f12cd3d36dd148398ae.pdf ; pp. 1-46.

System Dynamics Modeling of an Inspection-Based Process; Retrieved from Internet; URL: http://ieeexplore.ieee.org/document/493432/; Nov. 16, 2017.

* cited by examiner

SYSTEM AND METHOD FOR PREDICTING DEFECTS IN A COMPUTER PROGRAM

CROSS REFERENCE TO RELATED APPLICATION

This application is related to and claims the benefit of Indian Patent Application Number 201741032758 filed on Sep. 15, 2017, the contents of which are incorporated herein by reference in their entirety.

FIELD OF THE INVENTION

The present invention relates generally to computer program development. In particular, the present invention relates to a method and system for predicting defects in a computer program during its development.

BACKGROUND OF THE INVENTION

In today's time success of any business is becoming more and more dependent on users' engagement with computer programs like mobile and web applications associated with the business. As a result, any quality issue with such applications directly impacts the customer, which in turn has cascading effects on the business' success. Thus, development process of an application has become very critical to the success of the underlying business.

To ensure quality of the applications, organizations spend considerably high efforts in the testing of the applications which include various tests related to functionality of the applications. If an application responds with the expected results on test steps, the tests are deemed success. If there is a gap between the expected results and the actual results, tests are deemed to be failure.

Reasons for failure tests are created as defects or anomalies and they are corrected by contacting the respective software development team. As defects or anomalies requires additional effort in addressing them, organizations take several measures in reducing the cost associated with them. If any of the defects or anomalies remain uncovered during testing activity, the customer might face issue because of defective application or product. This in turn would affect the customer's satisfaction and thus, brand image of the business to a great extent.

Therefore, for success of the businesses, there is a need to predict the defects in their computer programs or applications when they are under development so as to identify and address the potential problems in real time and beforehand.

SUMMARY OF THE INVENTION

In an embodiment of the present invention, a system for predicting defects in a computer program during its development is provided. The system comprises a pattern identifier module which is configured to identify one or more frequent sets of source code files that have been modified together in a plurality of historical builds associated with the computer program. The one or more frequent sets of source code files may be identified by obtaining a plurality of historical commit logs from a source file version database, where the plurality of the historical commit logs provide details of the one or more modified source code files. The pattern identifier module further obtains details of the one or more historical builds associated with the computer program from a release tracking module. Thereafter, a list of one or more source code files modified in each of the historical builds is created by segmenting the one or more modified source code files over the one or more historical builds. Finally, the pattern identifier module applies a machine learning algorithm to the created list to identify the one or more frequent sets of source code files. Further, each set of the one or more frequent sets comprises a group of source code files that have been modified together in a predefined historical build. In an embodiment of the present invention, the source code files that have been modified together with a predefined minimum frequency value are considered to be a part of the frequent set of modified source code files.

The system further comprises a keyword extractor module which is configured to identify one or more frequent sets of defect keywords that have been logged together in the plurality of historical builds associated with the computer program. In order to identify the one or more frequent set of defect keywords, the keyword extractor module extract one or more defect keywords from one or more defects summaries. The one or more defect summaries are obtained from a defect tracker module. The keyword extractor module also obtains details of one or more historical builds associated with the computer program from a release tracking module. Thereafter, a list of the one or more defect keywords recorded in each of the historical builds is created by segmenting the extracted one or more defect keywords across the one or more historical builds. Finally, the keyword extractor module applies a machine learning algorithm to the created list to identify the one or more frequent set of defect keywords. Each set of the one or more frequent set of defect keywords comprises a group of defect keywords that have been recorded together in the one or more historical builds. In an embodiment of the present invention, the defect keywords that have been logged together with a predefined minimum frequency value are considered to be a part of the frequent set of the defect keywords.

The system further comprises a correlation engine which is configured to establish one or more patterns between the one or more frequent sets of modified source code files and the one or more frequent set of defect keywords by identifying co-occurrence between the one or more frequent sets of modified source code files and the one or more frequent sets of defect keywords for each historical build. The co-occurrence may be identified by creating a list of the one or more frequent sets of modified source code files and the one or more frequent sets of defect keywords for each historical build. Thereafter, a cross product is prepared based on the created list. The cross product is prepared for the one or more frequent sets of modified source code files and the one or more frequent sets of defect keywords for each historical build. Finally, the correlation engine applies a machine learning algorithm to the cross product to identify the co-occurrence between the one or more frequent sets of modified source code files and the one or more frequent sets of defect keywords for each historical build.

The system further comprises a defect recommendation engine configured to predict one or more defects in one or more new builds associated with the computer program based on the established one or more patterns. To predict the one or more defects, the defect recommendation engine is further configured to receive data associated with one or more new builds. Thereafter, one or more source code files that have been modified in the one or more new builds are identified. Finally, the defect recommendation engine matches the one or more source code files that have been modified in the one or more new builds with the one or more frequent sets of modified source code files identified from the established one or more patterns, where a match signifies a likelihood of receiving one or more defects in the new build. The type of the one or more defects is ascertained based on the co-occurring frequent sets of defect keywords. In an embodiment of the present invention, the one or more defects predicted in the one or more new builds are provided in form of reports. The reports comprise details about types of the predicted defects and details of the modified source code files in the one or more new builds. In another embodiment of the present invention, the one or more defects predicted in the one or more new builds are consumed as a microservice for integration with a software integration system.

In another embodiment of the present invention, a method for predicting defects in a computer program during its development is provided. The method comprises identifying one or more frequent sets of source code files that have been modified together in a plurality of historical builds associated with the computer program. The identification of the one or more frequent sets of source code files further comprises obtaining a plurality of historical commit logs from a source file version database, obtaining details of the one or more historical builds associated with the computer program from a release tracking module, creating a list of one or more source code files modified in each of the historical builds by segmenting the one or more modified source code files over the one or more historical builds, and applying a machine learning algorithm to the created list to identify the one or more frequent sets of source code files. Further, each set of the one or more frequent sets comprises a group of source code files that have been modified together in a predefined historical build. In an embodiment of the present invention, the source code files that have been modified together with a predefined minimum frequency value are considered to be a part of the frequent set of modified source code files The method further comprises identifying one or more frequent set of defect keywords that have been logged together in the plurality of historical builds associated with the computer program. The identification of the one or more frequent set of defect keywords further comprises extracting one or more defect keywords from one or more defects summaries obtained from a defect tracker module, obtaining details of one or more historical builds associated with the computer program from a release tracking module, creating a list of the one or more defect keywords recorded in each of the historical builds by segmenting the extracted one or more defect keywords across the one or more historical builds, and applying a machine learning algorithm to the created list to identify the one or more frequent set of defect keyword. Further, each set of the one or more frequent set of defect keywords comprises a group of defect keywords that have been recorded together in the one or more historical builds. In an embodiment of the present invention, the defect keywords that have been logged together with a predefined minimum frequency value are considered to be a part of the frequent set of the defect keywords.

The method further comprises establishing one or more patterns between the one or more frequent sets of modified source code files and the one or more frequent set of defect keywords by identifying co-occurrence between the one or more frequent sets of modified source code files and the one or more frequent sets of defect keywords for each historical build. The co-occurrence may be identified by creating a list of the one or more frequent sets of modified source code files and the one or more frequent sets of defect keywords for each historical build, preparing a cross product of the one or more frequent sets of modified source code files and the one or more frequent sets of defect keywords for each historical build, and finally applying a machine learning algorithm to the cross product to identify the co-occurrence between the one or more frequent sets of modified source code files and the one or more frequent sets of defect keywords for each historical build.

The method further comprises receiving data associated with one or more new builds associated with the computer program.

The method further comprises predicting one or more defects in the one or more new builds using the one or more established patterns. The prediction of the one or more defects in the one or more new builds comprises identifying one or more source code files that have been modified in the one or more new builds, and matching the one or more source code files that have been modified in the one or more new builds with one or more frequent sets of modified source code files identified from the established one or more patterns, wherein a match signifies a likelihood of receiving one or more defects in the new build, further wherein type of the one or more defects is ascertained based on the co-occurring frequent sets of defect keywords.

In yet another embodiment of the present invention, a computer program product is provided. The computer program product comprises a non-transitory computer-readable medium having computer-readable program code stored thereon, the computer-readable program code comprising instructions that when executed by a processor, cause the processor to: identify one or more frequent sets of source code files that have been modified together in plurality of historical builds associated with the computer program, identify one or more frequent set of defect keywords that have been logged together in the plurality of historical builds associated with the computer program, establish one or more patterns between the one or more frequent sets of modified source code files and the one or more frequent set of defect keywords by identifying co-occurrence between the one or more frequent sets of modified source code files and the one or more frequent sets of defect keywords for each historical build, receive data associated with one or more new builds associated with the computer program, and predict one or more defects in the one or more new builds using the one or more established patterns.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
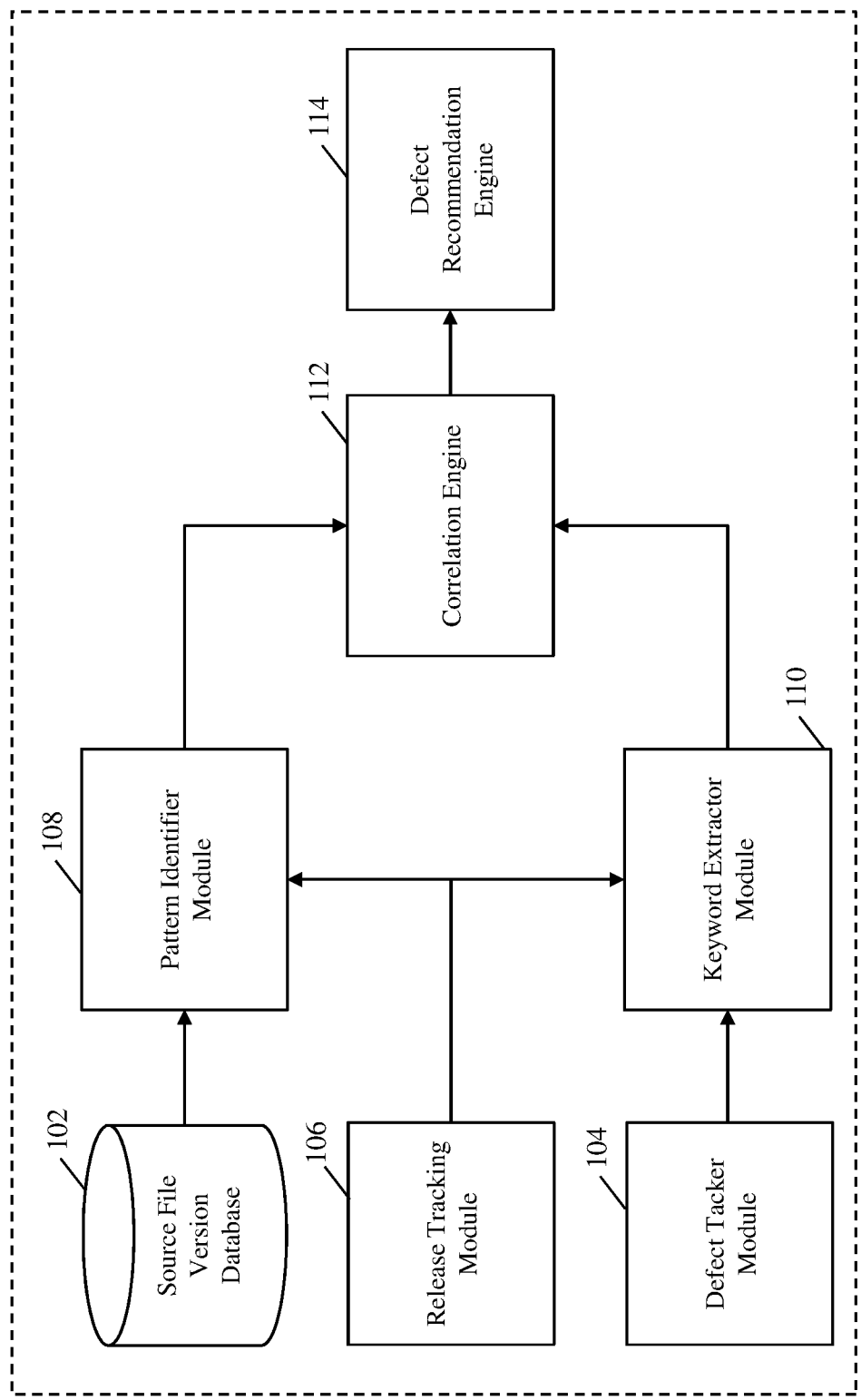
FIG. 1 is a block diagram illustrating a system for predicting defects in a computer program during its development in accordance with an embodiment of the present invention.

FIG. 1 is a block diagram illustrating a system 100 for predicting defects in a computer program during its development in accordance with an embodiment of the present invention. The system 100 comprises a source file version database 102, a defect tracker module 104, a release tracking module 106, a pattern identifier module 108, a keyword extractor module 110, a correlation engine 112, and a defect recommendation engine 114. The computer program whose defects are predicted by the system 100 may be, without any limitation, a mobile application and a web application. Further, the computer program may be developed using various Software Development Life Cycle (SDLC) models including, without any limitation, Agile model, Waterfall model, Iterative model, V model, Incremental model, Rapid Action Development model, and Spiral model. While the present invention has been disclosed using Agile model as an example, it would be apparent to a person of ordinary skill the art that the scope of the present invention is not limited to the Agile model only and may be implemented using other models as well. Thus, terms like sprint, which is specific to Agile, may have same scope as terms release or cycles which are used in other SDLC models. Each of the blocks of the system 100 would now be discussed in detail.

The source file version database 102 maintains historical audit or commit logs of modifications to the one or more source code files associated with the computer program. The modifications may comprise, without any limitation, addition, updates, deletion, and refactoring performed to the one or more source code files over a predefined extended period of time. The source file version database 102 may be associated with a version control system. In an example, the version control system may be, without any limitation, Apache Subversion (SVN) version control system available from the Apache Software Foundation of Forest Hill, Md. Further, it may be apparent to a person of skilled in the art that the task of sending the details of the modifications to the version control system may be referred to as a commit. The source file version database 102 may maintain information regarding each commit in the form of a commit log. The information may comprise, without any limitation, the identification of the one or more source code files in each commit, a timestamp indicating the date and time of the commit, and a commit message or note by the developer to indicate a reason for why the one or more source code files were modified.

The defect tracker module 104 is configured to record, track, address, and close one or more historical defects that have been identified in the computer program. A defect may be an error, a flaw, a mistake, a failure, or a fault in the software program that prevents the software program from behaving as intended, such as producing an incorrect result. Further, the one or more defects may be created out of testing of builds deployed in the testing or quality assurance environment during the same predefined period of time as that of the version history of the one or more source code files. It may be apparent to a person of ordinary skill in the art that a 'Build' is a version of the computer program which is being developed. It may further be apparent to a person of ordinary skill in the art that the defect tracker module 104 may record, track, and address the one or more defects in the form of one or more defect summaries. Further, the one or more defect summaries may be recorded, tracked, addressed, and closed with a timestamp indicating the date and time of their creation or occurrence.

The release tracking module 106 is configured to track and record details of one or more historical builds and one or more historical releases or sprints associated with the computer program. The release tracking module 106 may keep a track of the historical builds and sprints that have been promoted to the QA environment for validation activities. Each historical sprint may comprise plurality of builds. Further, the tracking may be done for the same predefined period of time as that of the version history of the one or more source code files and the one or more historical defects identified in the computer program.

The pattern identifier module 108 is communicatively coupled to the source file version database 102 and the release tracking module 106. The pattern identifier module 108 obtains plurality of historical commit logs from the source file version database 102 and the details of the historical builds or sprints associated with the computer program from the release tracking module 106. The commit logs may be obtained in an Extensible Markup Language (XML) format. The pattern identifier module 108 may also have an associated data store such as, without any limitation, a Relational database management system (RDBMS) and a Non Structured Query Language (NoSQL) system. The obtained commit logs may then be parsed from XML to RDBMS or NoSQL format using parsers such as, without any limitation, Logstash for further processing of the commit logs. The further processing of the commit logs may include segmentation of the commit logs across various historical builds or sprints associated with the computer program.

After the one or more commit logs have been segmented across various historical builds, the details of the one or more source code files modified in each of the historical builds may be ascertained based on the commit logs. In an exemplary embodiment of the present invention, Table 1 illustrates segmentation of the modified files.

TABLE 1

| S. No | Build number | Files modified |
|---|---|---|
| 1 | Build #1 | File 1, File 13, File 19, File 22, File 23 |
| 2 | Build #2 | File 1, File19, File 16, File 21, File 23 |
| 3 | Build #3 | File 13, File 18, File 22, File 29 |
| 4 | Build #n | File 1, File 19, File 21, File 23 |

As it may be seen from Table 1, during the predefined period of time, the File 1, File 13, File 19, File 22, and File 23 got modified in Build #1 across multiple sprints. Similarly, in Build #2, File 1, File 19, File 16, File 21, and File 23 got modified across multiple sprints and likewise. It may be apparent to a person of ordinary skill in the art that while Table 1 shows the segmentation of the one or more modified files at the build level, the pattern identifier module 108 may also identify or ascertain the segmentation of the one or more modified files at the sprint level of the computer program.

Once the list of source code files modified in each of the historical builds has been created, the pattern identifier module 108 applies a machine learning algorithm, to the created list, to identify one or more frequent sets of source code files modified in plurality of historical builds across the predefined period of time. Each frequent set of the one or more frequent sets may comprise a group of source code files that may have been modified together in a predefined historical build. For example, the pattern identifier module 108 may identify that in Build #1 File 1, File19, File23 modified together, across multiple sprints, and thus a set of these three files may be considered as a frequent set of modified source code files. Similarly, in Build #2, the pattern identifier module 108 may identify that File 1 and File 23 modified together, across multiple sprints, and thus a set of these two files may be considered as a frequent set of modified source code files for Build #2. In an embodiment of the present invention, the pattern identifier module 108 may apply Frequent Pattern Growth (FP-Growth) algorithm to identify the one or more frequent sets of modified source code files across the predefined period of time. Further in an embodiment of the present invention, the source code files that have been modified together with a predefined minimum frequency value may be considered to be a part of the frequent set of modified source code files. The output of the pattern identifier module 108 is then processed by the correlation engine 112.

The keyword extractor module 110 is communicatively coupled to the defect tracker module 104 and the release tracker module 106. The keyword extractor module 110 is configured to extract one or more defect keywords from the one or more defect summaries obtained from the defect tracker module 104. In an embodiment of the present invention, the keyword extractor module 110 may apply Rapid Automatic Keyword Extraction (RAKE) algorithm to extract the one or more defect keywords from the one or more defect summaries. The keyword extractor module 110 is further configured to create a list of one or more defect keywords recorded in each of the historical builds by segmenting the extracted one or more defect keywords into one or more historical builds or sprints with the help of the release tracking module 106. Table 2 illustrates an exemplary segmentation of the one or more extracted defect keywords.

TABLE 2

| S. No | Build number | Keyword list from defects of the respective Build |
|---|---|---|
| 1 | Build #1 | Keyword 1, Keyword 4, Keyword 6, Keyword 11, Keyword 21, Keyword 37 |
| 2 | Build #2 | Keyword 1, Keyword 3, Keyword 6, Keyword 19, Keyword 25, Keyword 39 |
| 3 | Build #3 | Keyword 6, Keyword 12, Keyword 33, Keyword 51, Keyword 55, Keyword 59 |
| 4 | Build #n | Keyword 2, Keyword 4, Keyword 19, Keyword 23, Keyword 21, Keyword 39 |

As it may be seen from Table 2, during the predefined period of time, the keyword identifier module identifies Keyword 1, Keyword 4, Keyword 6, Keyword 11, Keyword 21, and Keyword 37 from the recorded one or more defects during Build #1 across multiple sprints. In an embodiment of the present invention, Keyword 1, Keyword 4, Keyword 6, Keyword 11, Keyword 21, and Keyword 37 may be from a same defect recorded in Build #1. In another embodiment of the present invention, Keyword 1, Keyword 4, Keyword 6, Keyword 11, Keyword 21, and Keyword 37 may be from different defects recorded in Build #1. Similarly, in Build #2, Keyword 1, Keyword 3, Keyword 6, Keyword 19, Keyword 25, and Keyword 39 are identified from the one or more recorded defects across multiple sprints and likewise. It may be apparent to a person of ordinary skill in the art that while Table 2 shows the segmentation of the one or more extracted defect keywords at the build level, the keyword identifier module 110 may also segment the extracted defect keywords at the sprint or release level of the computer program.

Once the list of the one or more defect keywords recorded in each of the historical builds is created, the keyword extractor module 110 applies a machine learning algorithm to identify the one or more frequent sets of defect keywords that may have been logged or recorded together across the predefined period of time in the plurality of historical builds. Each frequent set of the one or more frequent sets may comprise a group of keywords that may have been logged together in a predefined historical build. For example, the keyword extractor module 110 may identify that in Build #1, Keyword 1 and Keyword 6 have logged together. This identification indicates that whenever Keyword 1 has logged, Keyword 2 has tend to co-occur with Keyword 1, where Keyword 1 and Keyword 2 may be from the same defect or from different defects recorded in Build #1. Similarly, in Build #2, Keyword 1 and Keyword 6 have again logged together. In an embodiment of the present invention, the keyword extraction module 110 applies FP-Growth algorithm to identify the one or more frequent sets of defect keywords. Further in an embodiment of the present invention, the defect keywords that have been logged together with a predefined minimum frequency value may be considered to be a part of the frequent set of defect keywords. The output of the pattern identifier module 108 is then processed by the correlation engine 112.

The correlation engine 112 is configured to establish one or more patterns between the outputs of the pattern identifier module 108 and the keyword extractor module 110. The correlation engine 112 receives the one or more frequent sets of modified source code files from the pattern identifier module 108. The correlation engine 112 further receives one or more frequent sets of defect keywords from the keyword extractor module 110. Thereafter, the correlation engine 112 establishes one or more patterns between the one or more frequent sets of the modified source code files, and the one or more frequent sets of defect keywords. In an embodiment of the present invention, the correlation engine 112 may establish the one or more patterns by identifying the co-occurrence between the one or more frequent sets of modified source code files and the one or more frequent sets of defect keywords for each historical build or sprint. If the correlation engine 112 identifies that the changes in a set of files consistently produces the defects with same set of keywords, then it implies that both sets are complimentary i.e. change in a particular set of source code files has consistently resulted in a particular set of defects.

In an embodiment of the present invention, the identification of complimentary set of source code files and defect keywords may be performed by creating a list of the one or more frequent sets of modified source code files and the one or more frequent sets of defect keywords for each historical build or sprint. In an exemplary embodiment of the present invention, Table 3 illustrates an exemplary list created by the correlation engine 112 for identification of complimentary frequent sets of modified source code files and frequent sets of defect keywords.

TABLE 3

| S. No | Build number | File sets matching per Build | Keyword set matching per Build |
|---|---|---|---|
| 1 | Build #1 | [File 1, File 19, File 23], File 23] | [Keyword 1, Keyword 6], |
| 2 | Build #2 | [File 1, File 23], [File 19, File 23] | [Keyword 1, Keyword 6] |
| 3 | Build #3 | [File 13, File 22] | [Keyword 12, Keyword 33] |
| 4 | Build #n | [File 1, File 19, File 23], [File 19, File 23], | [Keyword 19, Keyword 39] |

It may be apparent to a person of ordinary skill in the art that while Table 3 shows the list of the one or more frequent sets of modified source code files and the one or more frequent sets of defect keywords at the build level, the correlation engine 112 may also create the list at the sprint or release level of the computer program.

Once the list of the one or more frequent sets of modified source code files and the one or more frequent sets of defect keywords is created, a cross product between the one or more frequent sets of modified source code files and the one or more frequent sets of defect keywords may be prepared for each historical build or sprint. Table 4 shows an exemplary cross product between the one or more frequent sets of modified source code files and the one or more frequent sets of defect keywords for each historical build. It may be apparent to a person of ordinary skill in the art that while Table 4 shows an exemplary cross product at the build level, the correlation engine 112 may also create the cross product at the sprint level of the computer program.

| S. No | Build number | Cross product of frequently modified source code file sets and Keyword set separated by the delimiter '$$$' |
|---|---|---|
| 1 | Build #1 | [File 1, File 19, File 23] $$$ [Keyword 1, Keyword 6], [File 19, File 22, File 23] $$$ [Keyword 1, Keyword 6] |
| 2 | Build #2 | [File 1, File 23] $$$ [Keyword 1, Keyword 6], [File 19, File 23] $$$ [Keyword 1, Keyword 6] |
| 3 | Build #3 | [File 13, File 22] $$$ [Keyword 12, Keyword 33] |
| 4 | Build #n | [File 1, File 19, File 23] $$$ [Keyword 19, Keyword 39], [File 19, File 23] $$$ [Keyword 19, Keyword 39] |

Once the cross product between the one or more frequent sets of modified source code files and the one or more frequent sets of defect keywords has been created, the correlation engine 112 applies a machine learning algorithm to the cross product to identify the co-occurrence between the one or more frequent sets of modified source code files and the one or more frequent sets of defect keywords for each historical build. The co-occurrence implies that during the predefined Build #1, a modification in the frequent source code file set comprising File 1, File 19, and File 23 resulted in defects represented by Keyword 1 and Keyword 6. Similarly, a modification in the frequent source code file set comprising File 19, File 22, and File 23 resulted in defects represented by Keyword 1 and Keyword 6. In an embodiment of the present invention, the correlation engine 112 applies FP-Growth algorithm to identify the co-occurrence between the one or more frequent sets of modified source code files and the one or more frequent sets of defect keywords for each historical build or sprint.

The defect recommendation engine 114 receives the output of the correlation engine 112. The defect recommendation engine 114 further receives data associated with one or more new builds associated with the computer program. The one or more new builds may be associated with one or more new sprints or releases for the computer program. Further, the defect recommendation engine 114 is configured to identify one or more source code files that have been modified in the one or more new builds and determine if the modified source code files of the one or more new builds match with one or more of the frequent sets of modified source code files identified from the patterns received from the correlation engine 112. In an embodiment of the present invention, a match signifies that there is a high likelihood of receiving one or more defects in the new build as well, where the type of the defect may be ascertained based on the co-occurring frequent sets of defect keywords. For example, if the modified source code files of the new build match with a frequent set of the modified source code files then there is a high likelihood of getting a defect in the new build because the modified source code files from the correlation engine 112 correspond to a co-occurring defect. The defect recommendation engine 114 performs similar checks on all new builds in all new sprint cycles. For every occurring match, the defects based on the corresponding identified sets of frequent defect keywords are filtered and are recommended for testing. Thus, the prediction or forecasting of such defects in the new builds facilitates the testing team in focusing their testing efforts towards defect causing features and/or functionalities, rather than focusing their efforts on less defect prone features.

Further, in embodiments of the present invention, the correlation engine 112 may also be trained or configured to identify additional patterns between the other historical data like between one or more source files and one or more failure test cases, between user story keywords and one or more defect keywords, and between user story keywords and one or more failure test cases. The defect recommendation engine 114 may further be trained or configured to predict or forecast one or more test case failures for the one or more new builds based on these additional patterns.

Further, in an embodiment of the present invention, the one or more predicted defects in the one or more new builds may be provided to users in form of reports. The reports may comprise details about types of the predicted defects and details of the modified source code files in the one or more new builds or sprints. In another embodiment of the present invention, the one or more predicted defects may be consumed as a micro service for integration with any software integration system like, without any limitation, a CI (Continuous integration) system.

Figure 2:
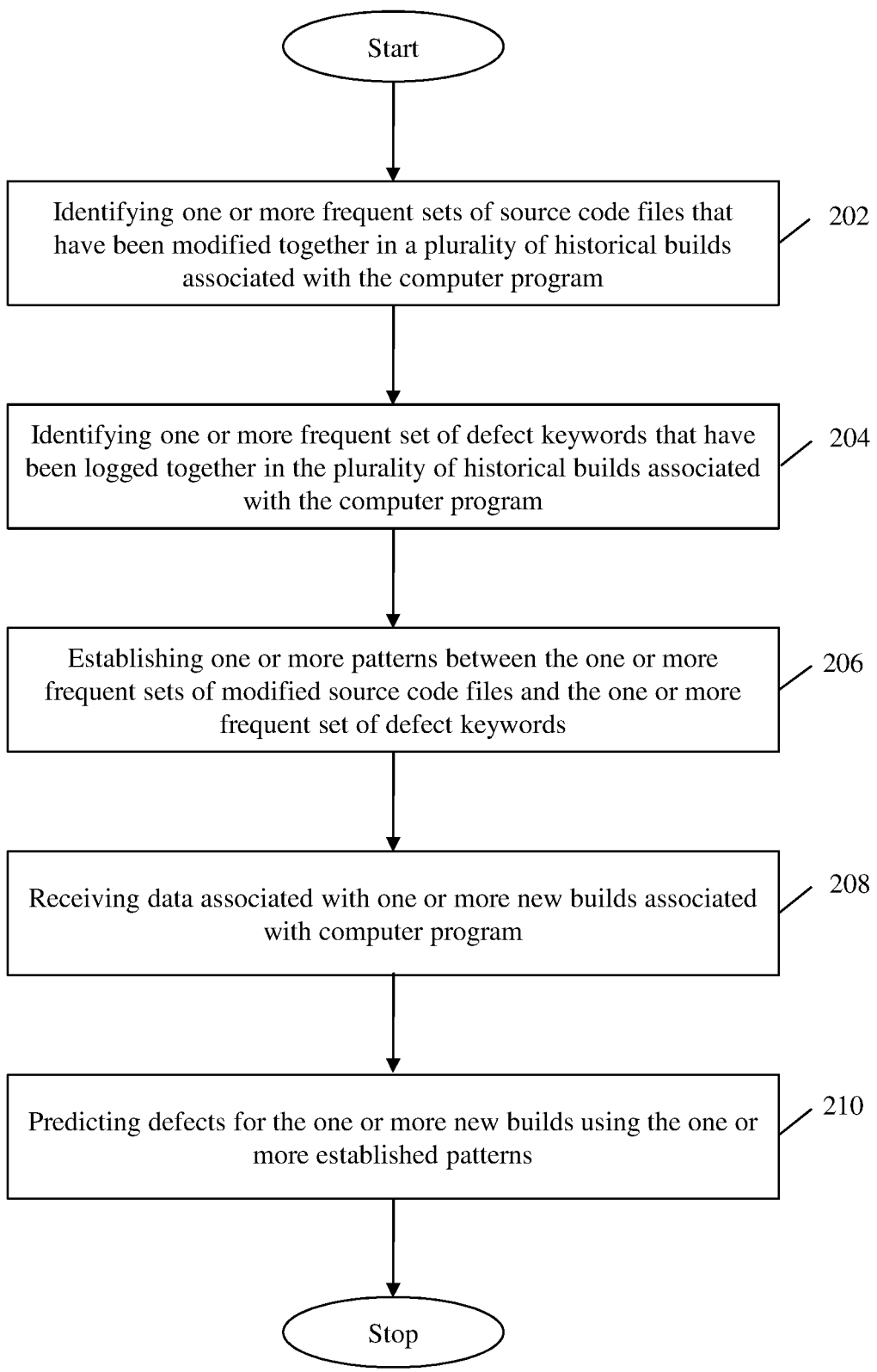
FIG. 2 is a flowchart illustrating a method for predicting defects in a computer program during its development in accordance with an embodiment of the present invention.

FIG. 2 is a flowchart illustrating a method for predicting defects in a computer program during its development in accordance with an embodiment of the present invention. The method initiates at step 202 with identifying one or more frequent sets of source code files which have been frequently modified together in plurality of historical builds, associated with the computer program, over a predefined extended period of time. The identification of the one or more frequent sets of source code files may be achieved by creating a list of the one or more source code files modified in each of the historical builds by segmenting the one or more modified source code files over the one or more historical build or sprint associated with the computer program. Thereafter, a machine learning algorithm may be applied to identify one or more frequent set of source code files modified across the predefined period of time. Each frequent set of source code files may be a group of source code files that may have modified together in a particular or predefined historical build. In an embodiment of the present invention, the machine learning algorithm may be FP-Growth algorithm. Further in an embodiment of the present invention, the source code files that have been modified together with a predefined minimum frequency value may be to be a part of the one or more frequent set of modified source code files.

At step 204, one or more frequent sets of defect keywords that have been logged together in the plurality of historical builds over the predefined extended period of time are identified. In an embodiment of the present invention, the one or more frequent sets of defect keywords may be identified by extracting one or more keywords from the defect summaries obtained from a defect tracker module. In an embodiment of the present invention, the one or more defect keywords may be extracted from the defect summaries using RAKE algorithm. Thereafter, the one or more extracted defect keywords are segmented based on one or more historical builds or sprints associated with the computer program to create a list of the one or more defect keywords recorded in each of the historical builds. Once the one or more keywords have been segmented, a machine learning algorithm may be applied to identify the one or more frequent set of keywords that may have been logged together in the plurality of historical builds across the predefined period of time. Each frequent set of the one or more frequent sets may comprise a group of keywords that may have been logged together in a predefined historical build. In an embodiment of the present invention, the machine learning algorithm may be FP-Growth algorithm. Further in an embodiment of the present invention, the keywords that have been logged together with a predefined minimum frequency value may be considered to be a part of the one or more frequent set of keywords.

At step 206, one or more patterns are established between the one or more frequent sets of modified source code files and the one or more frequent sets of defect keywords. In an embodiment of the present invention, the one or more patterns may be established by identifying co-occurrence between the one or more frequent sets of modified source code files and the one or more frequent sets of defect keywords for each historical build or sprint. The co-occurrence may be identified by creating a list of the one or more frequent sets of modified source code files and the one or more frequent sets of defect keywords for each historical build or sprint. Thereafter, based on the created list, a cross product between the one or more frequent sets of modified source code files and the one or more frequent sets of defect keywords may be prepared for each historical build or sprint. Once the cross product has been created, a machine learning algorithm may be applied to the cross product to identify the co-occurrence between the one or more frequent sets of modified source code files and the one or more frequent sets of defect keywords for each historical build or sprint. In an embodiment of the present invention, the machine learning algorithm is FP-Growth algorithm.

At step 208, data associated with one or more new builds is received. The one or more new builds may be associated with one or more new sprint cycles for the computer program. Further, the source code files corresponding to the one or more new builds may be modified.

At step 210, one or more defects are predicted for the one or more new builds using the established one or more patterns. In an embodiment of the present invention, to predict the one or more defects, the source code files that have been modified in the one or more new builds are matched with one or more of the frequent sets of modified source code files obtained from the patterns established in step 206. In an embodiment of the present invention, a match signifies that there is a high likelihood of receiving a defect in the new build as well. The type of the defect may be ascertained based on the co-occurring frequent sets of defect keywords.

In an embodiment of the present invention, the one or more predicted defects in the one or more new builds may be provided to users in form of reports The reports may comprise details about types of the predicted defects and details of the modified source code files in the one or more new builds or sprints. In another embodiment of the present invention, the one or more predicted defects may be consumed as a microservice for integration with any software integration system like, without any limitation, a CI (Continuous integration) system.

Figure 3:
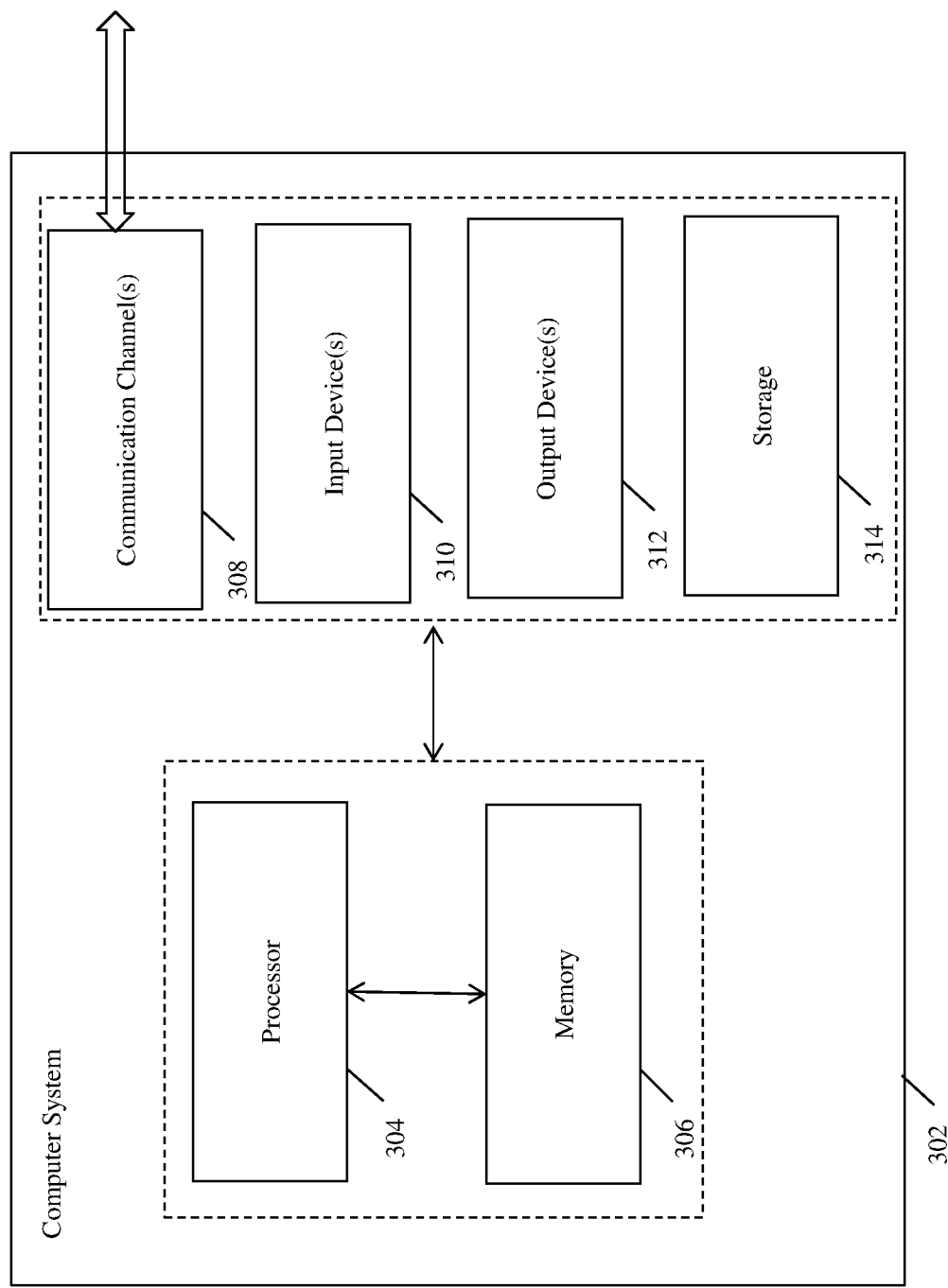
FIG. 3 illustrates an exemplary computer system in which various embodiments of the present invention may be implemented.

FIG. 3 illustrates an exemplary computer system in which various embodiments of the present invention may be implemented.

The computer system 302 comprises a processor 304 and a memory 306. The processor 304 executes program instructions and may be a physical processor. The processor 304 may also be a virtual processor. The computer system 302 is not intended to suggest any limitation as to scope of use or functionality of described embodiments. For example, the computer system 302 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. Further in an embodiment of the present invention, an optimal requirement for the memory 306 may be 8 Gigabytes. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various software executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A system for predicting defects in a computer program during its development, the system comprising:
    a memory storing program instructions;
    a processor executing the program instructions and configured to: apply a machine learning algorithm including a Frequent Pattern Growth (FP-Growth) algorithm to one or more sets of source code files to identify one or more frequent sets of source code files that have been modified together in a plurality of historical builds associated with the computer program;
    identify one or more frequent sets of defect keywords that have been logged together in the plurality of historical builds associated with the computer program, wherein the defect keywords that have been logged together with a predefined minimum frequency value are considered to be a part of the frequent set of the defect keywords;
    establish one or more patterns between the one or more frequent sets of modified source code files and the one or more frequent set of defect keywords by identifying co-occurrence between the one or more frequent sets of modified source code files and the one or more frequent sets of defect keywords for each historical build;
    predict one or more defects in one or more new builds associated with the computer program based on the established one or more patterns, wherein predicting the or more defects comprises:
    matching the one or more source code files that have been modified in the one or more new builds with the one or more frequent sets of modified source code files identified from the established one or more patterns, wherein a match signifies a likelihood of receiving one or more defects in the new build,
    wherein, for every occurring match, the processor filters the defects based on the corresponding identified sets of frequent defect keywords, and recommends the filtered defects for testing,
    wherein the processor is trained to learn historical data patterns known to cause a previous defect in a given historical build among the plurality of historical builds of the software program, the learned historical data patterns including at least one of patterns between one or more source files and one or more failure test cases, between user story keywords and one or more defect keywords, and between user story keywords and one or more failure test cases, and following the training is configured to predict the one or more defects associated with the one or more new builds based on the previous defect learned from the historical data patterns.

2. The system of claim 1, wherein to identify the one or more frequent sets of source code files, the processor is configured to:
    obtain a plurality of historical commit logs from a source file version database, wherein the plurality of the historical commit logs provide details of the one or more modified source code files;
    obtain details of the one or more historical builds associated with the computer program from a release tracking module; and
    create a list of one or more source code files modified in each of the historical builds by segmenting the one or more modified source code files over the one or more historical builds.

3. The system of claim 2, wherein each set of the one or more frequent sets comprises a group of source code files that have been modified together in a predefined historical build.

4. The system of claim 3, wherein the source code files that have been modified together with the predefined minimum frequency value are considered to be a part of the frequent set of modified source code files.

5. The system of claim 1, wherein to identify the one or more frequent set of defect keywords, the processor is configured to:
    extract one or more defect keywords from one or more defects summaries;
    obtain details of one or more historical builds associated with the computer program;
    create a list of the one or more defect keywords recorded in each of the historical builds by segmenting the extracted one or more defect keywords across the one or more historical builds; and
    apply a machine learning algorithm to the created list to identify the one or more frequent set of defect keywords.

6. The system of claim 1, wherein each set of the one or more frequent sets of defect keywords comprises a group of defect keywords that have been recorded together in the one or more historical builds.

7. The system of claim 1, wherein to identify the co-occurrence between the one or more frequent sets of modified source code files and the one or more frequent sets of defect keywords, the processor is configured to:
- create a list of the one or more frequent sets of modified source code files and the one or more frequent sets of defect keywords for each historical build;
- prepare a cross product, based on the created list, of the one or more frequent sets of modified source code files and the one or more frequent sets of defect keywords for each historical build; and
- apply a machine learning algorithm to the cross product to identify the co-occurrence between the one or more frequent sets of modified source code files and the one or more frequent sets of defect keywords for each historical build.

8. The system of claim 1, wherein to predict one or more defects in one or more new builds, the processor is configured to:
- receive data associated with one or more new builds; and
- identify one or more source code files that have been modified in the one or more new builds.

9. The system of claim 8, wherein a type of the one or more defects is ascertained based on co-occurring frequent sets of defect keywords.

10. The system of claim 1, wherein the one or more defects predicted in the one or more new builds are provided in form of reports, wherein the reports comprise details about types of the predicted defects and details of the modified source code files in the one or more new builds.

11. The system of claim 1, wherein the one or more defects predicted in the one or more new builds are consumed as a micro service for integration with a software integration system.

12. A method for predicting defects in a computer program during its development, the method comprising:
- applying, by a processor, a machine learning algorithm including a Frequent Pattern Growth (FP-Growth) algorithm to one or more sets of source code files;
- identifying the among the one or more sets of source code files one or more frequent sets of source code files that have been modified together in a plurality of historical builds associated with the computer program;
- identifying one or more frequent set of defect keywords that have been logged together in the plurality of historical builds associated with the computer program, wherein each set of the one or more frequent set of defect keywords comprises a group of defect keywords that have been recorded together in the one or more historical builds, further wherein the defect keywords that have been logged together with a predefined minimum frequency value are considered to be a part of the frequent set of the defect keywords;
- establishing one or more patterns between the one or more frequent sets of modified source code files and the one or more frequent set of defect keywords by identifying co-occurrence between the one or more frequent sets of modified source code files and the one or more frequent sets of defect keywords for each historical build;
- receiving data associated with one or more new builds associated with the computer program; and
- predicting one or more defects in the one or more new builds using the one or more established patterns, wherein the predicted or more defects comprises:
  - matching the one or more source code files that have been modified in the one or more new builds with the one or more frequent sets of modified source code files identified from the established one or more patterns, wherein a match signifies a likelihood of receiving one or more defects in the new build,
  - wherein, for every occurring match, the processor filters the defects based on the corresponding identified sets of frequent defect keywords, and recommends the filtered defects for testing;
- wherein the processor is trained to learn historical data patterns known to cause a previous defect in a given historical build among the plurality of historical builds of the software program, the learned historical data patterns including at least one of patterns between one or more source files and one or more failure test cases, between user story keywords and one or more defect keywords, and between user story keywords and one or more failure test cases, and following the training is configured to predict the one or more defects associated with the one or more new builds based on the previous defect learned from the historical data patterns.

13. The method of claim 12, wherein identifying the one or more frequent sets of source code files comprises:
- obtaining a plurality of historical commit logs from a source file version database, wherein the plurality of the historical commit logs provide details of the one or more modified source code files;
- obtaining details of the one or more historical builds associated with the computer program from a release tracking module;
- creating a list of one or more source code files modified in each of the historical builds by segmenting the one or more modified source code files over the one or more historical builds; and
- applying a machine learning algorithm to the created list to identify the one or more frequent sets of source code files.

14. The method of claim 13, wherein each set of the one or more frequent sets comprises a group of source code files that have been modified together in a predefined historical build, further wherein the source code files that have been modified together with the predefined minimum frequency value are considered to be a part of the frequent set of modified source code files.

15. The method of claim 12, wherein identifying the one or more frequent set of defect keywords comprises:
- extracting one or more defect keywords from one or more defects summaries;
- obtaining details of one or more historical builds associated with the computer program;
- creating a list of the one or more defect keywords recorded in each of the historical builds by segmenting the extracted one or more defect keywords across the one or more historical builds; and
- applying a machine learning algorithm to the created list to identify the one or more frequent set of defect keywords.

16. The method of claim 12, wherein identifying the co-occurrence between the one or more frequent sets of modified source code files and the one or more frequent sets of defect keywords comprises:
- creating a list of the one or more frequent sets of modified source code files and the one or more frequent sets of defect keywords for each historical build;
- preparing a cross product, based on the created list, of the one or more frequent sets of modified source code files and the one or more frequent sets of defect keywords for each historical build; and applying a machine learning algorithm to the cross product to identify the co-occurrence between the one or more frequent sets of modified source code files and the one or more frequent sets of defect keywords for each historical build.

17. The method of claim 12, wherein predicting the one or more defects in the one or more new builds comprises:
identifying one or more source code files that have been modified in the one or more new builds; and
matching the one or more source code files that have been modified in the one or more new builds with one or more frequent sets of modified source code files identified from the established one or more patterns, wherein a match signifies a likelihood of receiving one or more defects in the new build, further wherein type of the one or more defects is ascertained based on the co-occurring frequent sets of defect keywords.

18. A computer program product comprising:
a non-transitory computer-readable medium having computer-readable program code stored thereon, the computer-readable program code comprising instructions that when executed by a processor, cause the processor to:
identify one or more frequent sets of source code files that have been modified together in plurality of historical builds associated with the computer program;
identify one or more frequent set of defect keywords that have been logged together in the plurality of historical builds associated with the computer program, wherein the defect keywords that have been logged together with a predefined minimum frequency value are considered to be a part of the frequent set of the defect keywords;
establish one or more patterns between the one or more frequent sets of modified source code files and the one or more frequent set of defect keywords by identifying co-occurrence between the one or more frequent sets of modified source code files and the one or more frequent sets of defect keywords for each historical build;
receive data associated with one or more new builds associated with the computer program; and
predict one or more defects in the one or more new builds using the one or more established patterns,
wherein the processor is trained to learn historical data patterns known to cause a previous defect in a given historical build among the plurality of historical builds of the software program, the learned historical data patterns including at least one of patterns between one or more source files and one or more failure test cases, between user story keywords and one or more defect keywords, and between user story keywords and one or more failure test cases, and following the training is configured to predict the one or more defects associated with the one or more new builds based on the previous defect learned from the historical data patterns.

* * * * *